United States Patent
Lee et al.

(10) Patent No.: US 12,047,182 B2
(45) Date of Patent: Jul. 23, 2024

(54) METHOD AND APPARATUS FOR TRANSMITTING AND RECEIVING WIRELESS SIGNAL IN WIRELESS COMMUNICATION SYSTEM

(71) Applicant: LG ELECTRONICS INC., Seoul (KR)

(72) Inventors: Youngdae Lee, Seoul (KR); Joonkui Ahn, Seoul (KR); Suckchel Yang, Seoul (KR); Jiwon Kang, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/947,698

(22) Filed: Sep. 19, 2022

(65) Prior Publication Data
US 2023/0028180 A1  Jan. 26, 2023

Related U.S. Application Data

(63) Continuation of application No. PCT/KR2021/010211, filed on Aug. 4, 2021.

(60) Provisional application No. 63/061,756, filed on Aug. 5, 2020.

(51) Int. Cl.
*H04L 1/1812* (2023.01)
*H04L 1/1822* (2023.01)
*H04W 72/23* (2023.01)

(52) U.S. Cl.
CPC .......... *H04L 1/1822* (2013.01); *H04L 1/1812* (2013.01); *H04W 72/23* (2023.01)

(58) Field of Classification Search
CPC ....... H04L 1/1822; H04L 1/1812; H04L 1/00; H04L 1/18; H04L 5/00; H04L 5/0053;
(Continued)

(56) References Cited

U.S. PATENT DOCUMENTS 11,395,260 B2 *  7/2022  Liu ................ H04L 1/1896
2014/0044071 A1  2/2014  Piggin et al.
(Continued)

FOREIGN PATENT DOCUMENTS

CN  109391379 A  2/2019
WO  2020143417 A1  7/2020

OTHER PUBLICATIONS

LG Electronics, "Further details on enhancements for multi-cell multicast/broadcast", 3GPP TSG RAN WG1 Meeting #85, May 23-27, 2016, R1-164536.
(Continued)

*Primary Examiner* — Hanh N Nguyen
(74) *Attorney, Agent, or Firm* — BRYAN CAVE LEIGHTON PAISNER LLP

(57) ABSTRACT

A terminal according to one embodiment of the present invention may: receive multicast configuration information including an indicator indicating whether G-RNTI and HARQ processes related to at least one downlink multicast service are activated; receive DCI in which CRC is scrambled with a G-RNTI on a specific downlink frequency resource; perform decoding of a multicast TB carried by a PDSCH on the basis of the DCI; and transmit and receive information on the decoding result of the multicast TB through a PUCCH resource indicated by the DCI on a specific uplink frequency resource, on the basis of the indicator included in the multicast configuration information indicating activation of the HARQ process.

13 Claims, 14 Drawing Sheets

(58) Field of Classification Search
CPC ..... H04L 1/1861; H04L 1/1864; H04L 5/053; H04W 72/23; H04W 4/06; H04W 72/04; H04W 76/11; H04W 72/0453; H04W 72/30
See application file for complete search history.

(56) References Cited

U.S. PATENT DOCUMENTS

| | | | |
|---|---|---|---|
| 2019/0075614 A1* | 3/2019 | Li | H04L 51/58 |
| 2019/0132141 A1 | 5/2019 | Li et al. | |
| 2019/0313459 A1 | 10/2019 | Zhang et al. | |
| 2020/0295903 A1* | 9/2020 | Faxér | H04L 1/1812 |
| 2021/0111835 A1* | 4/2021 | Khoshnevisan | H04L 5/0055 |
| 2021/0127450 A1* | 4/2021 | Abdoli | H04W 76/27 |
| 2022/0210766 A1* | 6/2022 | Liu | H04W 72/30 |
| 2022/0322292 A1* | 10/2022 | Takeda | H04L 5/0053 |
| 2023/0050170 A1* | 2/2023 | Wang | H04L 1/1685 |
| 2023/0379943 A1* | 11/2023 | Wang | H04W 72/30 |

OTHER PUBLICATIONS

MCC Support, "Final Report of 3GPP TSG RAN WG1 #99 v1.0.0 (Reno, USA, Nov. 18-22, 2019)", 3GPP TSG RAN WG1 Meeting #100-e, Feb. 24-Mar. 6, 2020, R1-2000151.

ZTE Corporation, "Remaining issues on the configured grant for NR-U", 3GPP TSG RAN WG1 Meeting #100b, Apr. 20-30, 2020, R1-2001708.

* cited by examiner

Non - interleaved CCE - to - REG mapping

METHOD AND APPARATUS FOR TRANSMITTING AND RECEIVING WIRELESS SIGNAL IN WIRELESS COMMUNICATION SYSTEM

CROSS-REFERENCE TO RELATED APPLICATIONS

This application is a Continuation Bypass of International Application No. PCT/KR2021/010211, filed on Aug. 4, 2021, which claims benefit of U.S. Provisional Application No. 63/061,756, filed on Aug. 5, 2020, the contents of which are all hereby incorporated by reference herein in their entirety.

TECHNICAL FIELD

The present disclosure relates to a wireless communication system, and more particularly, to a method and apparatus for transmitting/receiving a wireless signal.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

An object of the present disclosure is to provide a method of efficiently performing wireless signal transmission/reception procedures and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In one aspect of the present disclosure, a method for receiving a signal by a terminal in a wireless communication system may include receiving multicast configuration information including a group-radio network temporary identifier (G-RNTI) and an indicator indicating whether a hybrid automatic repeat request (HARQ) process related to at least one downlink multicast service is enabled; receiving downlink control information (DCI) having a cyclic redundancy check (CRC) scrambled with the G-RNTI on a specific downlink frequency resource; decoding a multicast transport block (TB) carried by a physical downlink shared channel (PDSCH) based on the DCI; and based on the indicator included in the multicast configuration information indicating enabling of the HARQ process, transmitting information about a result of the decoding of the multicast TB through a physical uplink control channel (PUCCH) resource indicated by the DCI on a specific uplink frequency resource.

A service ID may be configured for each of the at least one downlink multicast service.

The multicast configuration information may provide the G-RNTI and the indicator, for each service ID.

Each of the specific downlink frequency resource and the specific uplink frequency resource may be related to an active bandwidth part (BWP), an initial BWP or a default BWP of the terminal.

The at least one downlink multicast service may be a 3rd generation partnership project (3GPP)-based multicast and broadcast service (MBMS). The multicast configuration information may provide uplink resource configuration information for performing at least one of HARQ-ACK (acknowledgement) reporting and MBMS-related channel state information (CSI) reporting for each MBMS service ID. The uplink resource configuration information included in the multicast configuration information may be related to PUCCH resource configuration information or uplink bandwidth part (BWP) configuration information.

The terminal may receive the DCI by monitoring a physical downlink control channel (PDCCH) in a search space associated with a service ID of a downlink multicast service to be received by the terminal. The terminal may select the associated search space from among one or more search spaces configured for the terminal, based on the service ID.

The transmitting of the information about the result of the decoding of the multicast TB may be performed only when the enabling of the HARQ process is indicated for the downlink multicast service.

The multicast configuration information may be received through higher layer signaling.

The multicast TB may contain multicast traffic channel (MTCH) data of the downlink multicast service.

In another aspect of the present disclosure, a computer-readable recording medium having recorded thereon a program for carrying out the signal reception method may be provided.

In another aspect of the present disclosure, a terminal for carrying out the signal reception method may be provided.

In another aspect of the present disclosure, a device for controlling a terminal for carrying out the signal reception method may be provided.

In another aspect of the present disclosure, a method for transmitting a signal by a base station in a wireless communication system may include transmitting multicast configuration information including a group-radio network temporary identifier (G-RNTI) and an indicator indicating whether a hybrid automatic repeat request (HARQ) process related to at least one downlink multicast service is enabled; transmitting downlink control information (DCI) having a cyclic redundancy check (CRC) scrambled with the G-RNTI on a specific downlink frequency resource; transmitting a physical downlink shared channel (PDSCH) including a multicast transport block (TB) based on the DCI; and based on the indicator included in the multicast configuration information indicating enabling of the HARQ process, receiving, from a terminal, a HARQ-acknowledgement (ACK) report on the multicast TB through a physical uplink control channel (PUCCH) resource indicated by the DCI on a specific uplink frequency resource.

In another aspect of the present disclosure, a base station for performing the signal transmission method may be provided.

Advantageous Effects

According to an embodiment of the present disclosure, whether a HARQ process for a downlink multicast service is enabled and a radio resource to be used for the same may be clearly defined between a UE and a BS.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

MODE FOR INVENTION

Figure 1:
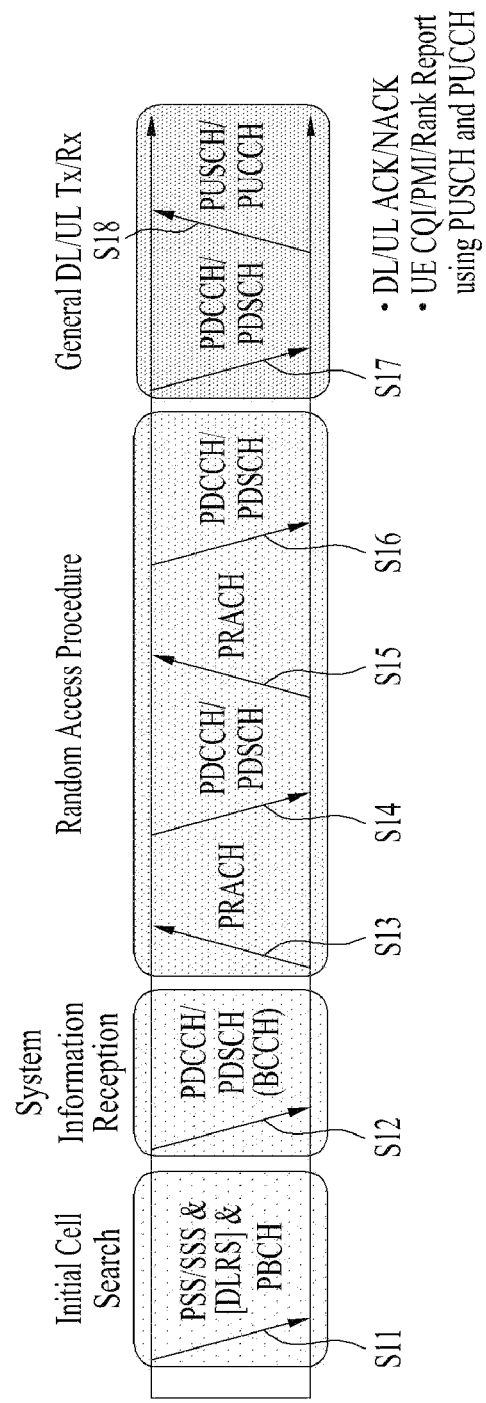
FIG. 1 illustrates physical channels used in a 3rd generation partnership project (3GPP) system as an exemplary wireless communication system, and a general signal transmission method using the same.

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

The following documents may be referred to for background description, terminology definitions, abbreviations, and the like related to the present disclosure.

3GPP LTE
TS 36.211: Physical channels and modulation
TS 36.212: Multiplexing and channel coding
TS 36.213: Physical layer procedures
TS 36.300: Overall description
TS 36.321: Medium Access Control (MAC)
TS 36.331: Radio Resource Control (RRC)
3GPP NR
TS 38.211: Physical channels and modulation
TS 38.212: Multiplexing and channel coding
TS 38.213: Physical layer procedures for control
TS 38.214: Physical layer procedures for data
TS 38.300: NR and NG-RAN Overall Description
TS 38.321: Medium Access Control (MAC)
TS 38.331: Radio Resource Control (RRC) protocol specification
Abbreviations and Terms
PDCCH: Physical Downlink Control CHannel
PDSCH: Physical Downlink Shared CHannel
PUSCH: Physical Uplink Shared CHannel
CSI: Channel state information
RRM: Radio resource management
RLM: Radio link monitoring
DCI: Downlink Control Information
CAP Channel Access Procedure
Ucell: Unlicensed cell
PCell: Primary Cell
PSCell: Primary SCG Cell
TBS: Transport Block Size
SLIV: Starting and Length Indicator Value
BWP: BandWidth Part
CORESET: COntrol REsourse SET
REG: Resource element group
SFI: Slot Format Indicator
COT: Channel occupancy time
SPS: Semi-persistent scheduling
PLMN ID: Public Land Mobile Network identifier
RACH: Random Access Channel
RAR: Random Access Response
MBMS: Multimedia Broadcast/Multicast Service Msg3: Message transmitted on UL-SCH containing a C-RNTI MAC CE or CCCH SDU, associated with the UE contention resolution, as part of a random access procedure.

Special Cell: For dual connectivity operation, the term special cell refers to the PCell of the MCG or the PSCell of the SCG depending on whether the MAC entity is associated with the MCG or the SCG. Otherwise, the term special cell refers to the PCell. The special cell supports PUCCH transmission and contention-based random access, and is always activated.

Serving Cell: A PCell, a PSCell, or an SCell

MBSFN Synchronization Area: (In case of an LTE network) an area of the network where all eNodeBs can be synchronized and perform MBSFN transmissions. MBSFN synchronization areas are capable of supporting one or more MBSFN areas. On a given frequency layer, an eNodeB can only belong to one MBSFN synchronization area. MBSFN synchronization areas are independent from the definition of MBMS service areas.

MBSFN transmission or a transmission in MBSFN mode: a simultaneous broadcast scheme performed by transmitting the same waveforms at the same time from multiple cells. An MBSFN transmission from multiple cells within the MBSFN area is seen as a single transmission by a UE.

MBSFN Area: an MBSFN area consists of a group of cells within an MBSFN synchronization area of a network, which are co-ordinated for MBSFN. Except for the MBSFN area reserved cells, all cells within the MBSFN area contribute to the MBSFN transmission and advertise availability of MBSFN. The UE may only need to consider a subset of the configured MBSFN area (i.e., service(s) of interest).

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step 5101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
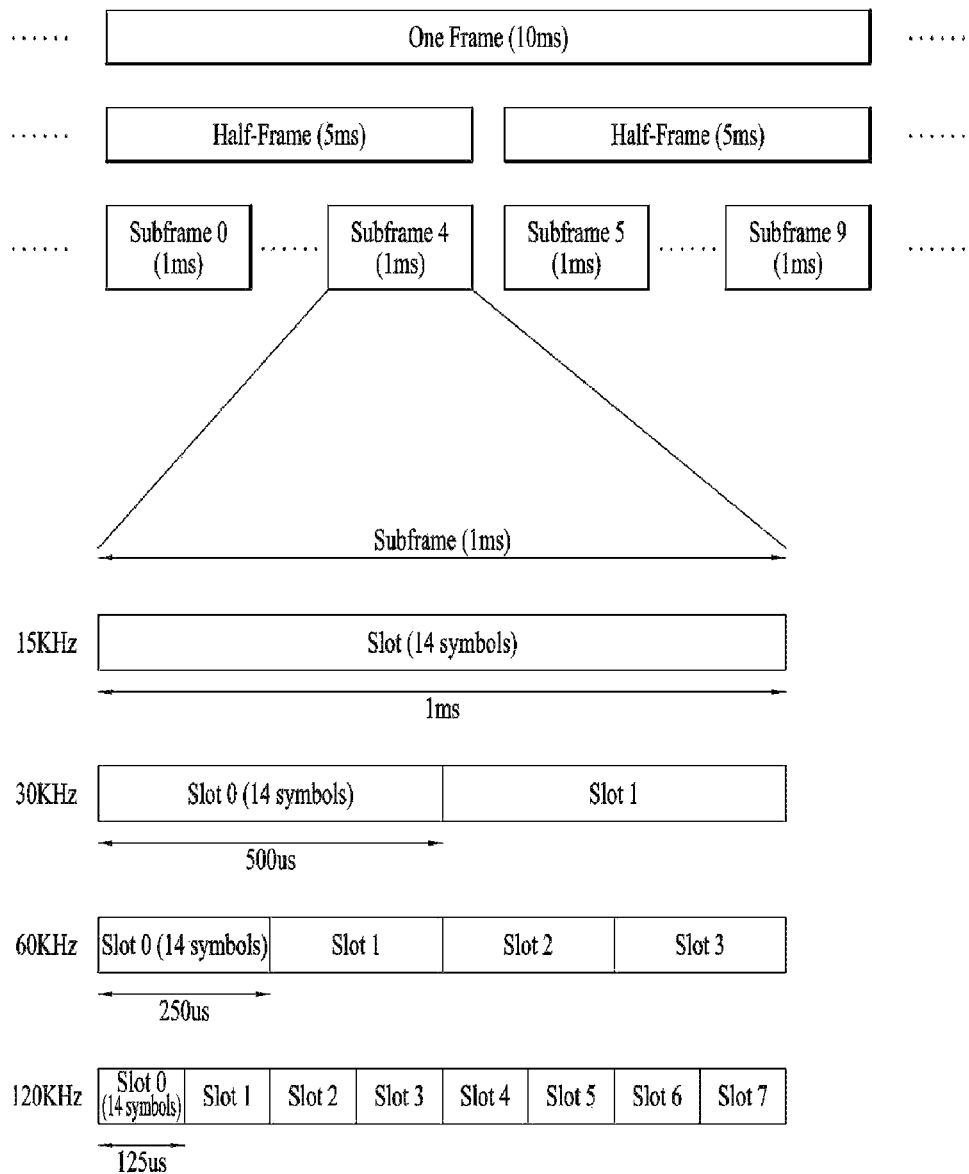
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: Number of symbols in a slot
* $N^{frame,u}_{slot}$: Number of slots in a frame
* $N^{subframe,u}_{slot}$: Number of slots in a subframe Table 2 illustrates that the number of symbols per slot, the number of slots per frame, and the number of slots per subframe vary according to the SCS when the extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
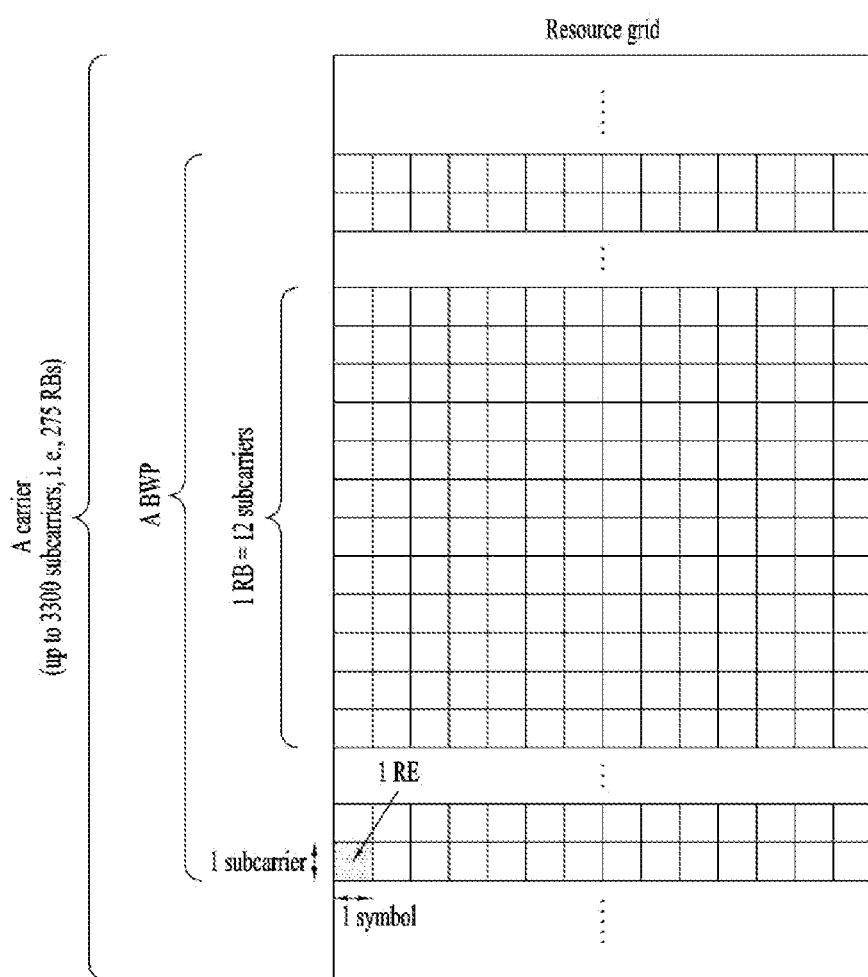
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
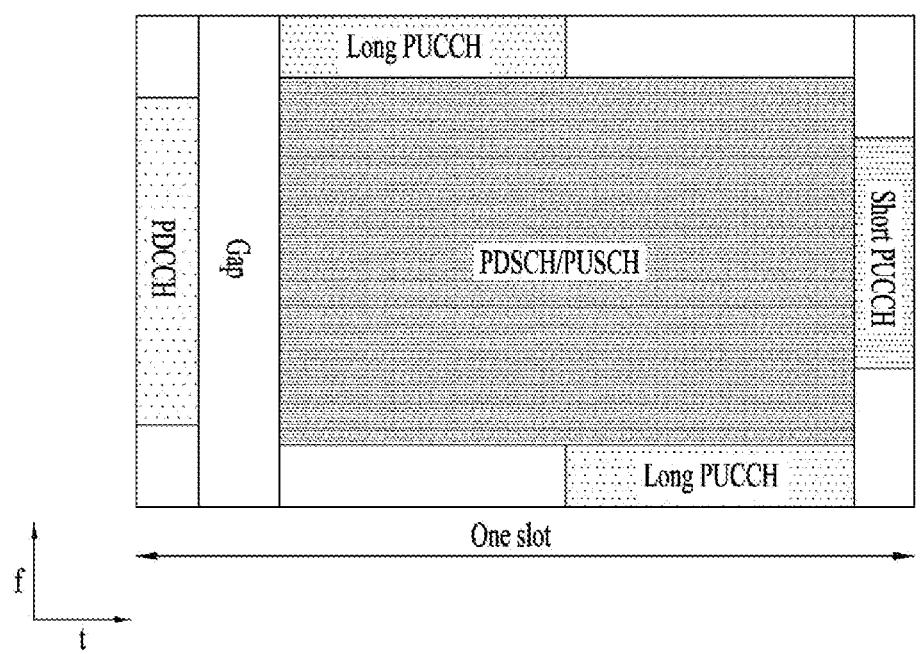
FIG. 4 illustrates exemplary mapping of physical channels in a slot.

FIG. 4 illustrates exemplary mapping of physical channels in a slot. In the NR system, a frame is characterized by a self-contained structure in which all of a DL control channel, DL or UL data, and a UL control channel may be included in one slot. For example, the first N symbols (hereinafter, referred to as a DL control region) of a slot may be used to transmit a DL control channel (e.g., PDCCH), and the last M symbols (hereinafter, referred to as a UL control region) of the slot may be used to transmit a UL control channel (e.g., PUCCH). Each of N and M is an integer equal to or larger than 0. A resource region (hereinafter, referred to as a data region) between the DL control region and the UL control region may be used to transmit DL data (e.g., PDSCH) or UL data (e.g., PUSCH). A guard period (GP) provides a time gap for transmission mode-to-reception mode switching or reception mode-to-transmission mode switching at a BS and a UE. Some symbol at the time of DL-to-UL switching in a subframe may be configured as a GP.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

Figure 5:
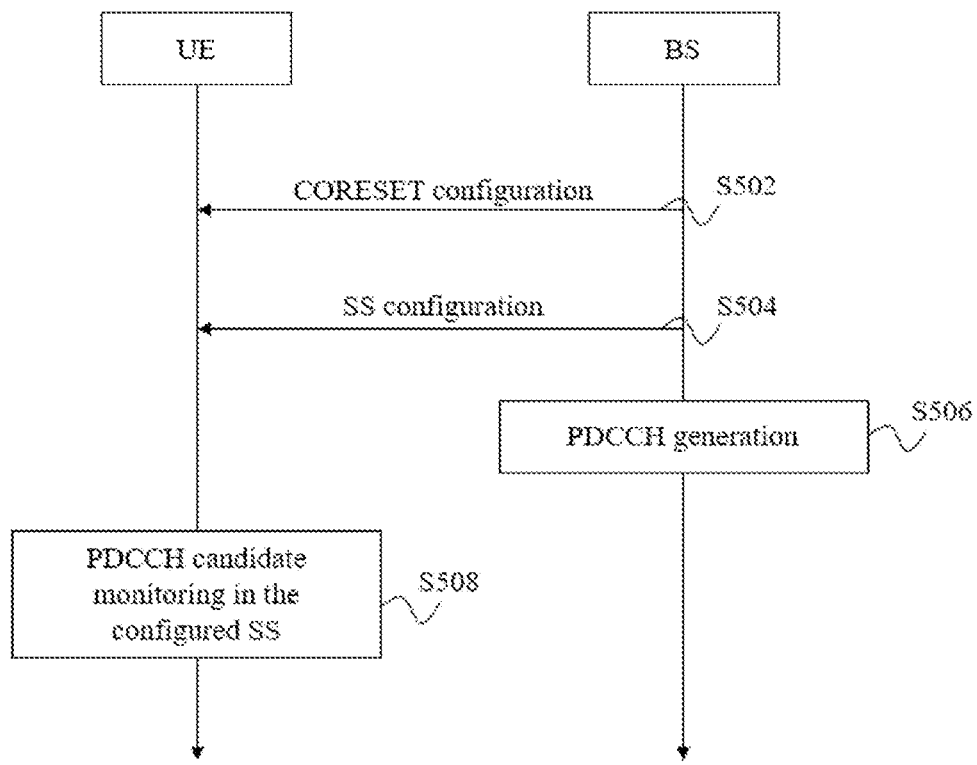
FIG. 5 is a diagram illustrating a signal flow for a physical downlink control channel (PDCCH) transmission and reception process.

FIG. 5 is a diagram illustrating a signal flow for a PDCCH transmission and reception process.

Referring to FIG. 5, a BS may transmit a control resource set (CORESET) configuration to a UE (S502). A CORSET is defined as a resource element group (REG) set having a given numerology (e.g., an SCS, a CP length, and so on). An REG is defined as one OFDM symbol by one (P)RB. A plurality of CORESETs for one UE may overlap with each other in the time/frequency domain. A CORSET may be configured by system information (e.g., a master information block (MIB)) or higher-layer signaling (e.g., radio resource control (RRC) signaling). For example, configuration information about a specific common CORSET (e.g., CORESET #0) may be transmitted in an MIB. For example, a PDSCH carrying system information block 1 (SIB1) may be scheduled by a specific PDCCH, and CORSET #0 may be used to carry the specific PDCCH. Configuration information about CORESET #N (e.g., N>0) may be transmitted by RRC signaling (e.g., cell-common RRC signaling or UE-specific RRC signaling). For example, the UE-specific RRC signaling carrying the CORSET configuration information may include various types of signaling such as an RRC setup message, an RRC reconfiguration message, and/or BWP configuration information. Specifically, a CORSET configuration may include the following information/fields.

controlResourceSetId: indicates the ID of a CORESET.

frequencyDomainResources: indicates the frequency resources of the CORESET. The frequency resources of the CORESET are indicated by a bitmap in which each bit corresponds to an RBG (e.g., six (consecutive) RBs). For example, the most significant bit (MSB) of the bitmap corresponds to a first RBG. RBGs corresponding to bits set to 1 are allocated as the frequency resources of the CORESET.

duration: indicates the time resources of the CORESET. Duration indicates the number of consecutive OFDM symbols included in the CORESET. Duration has a value of 1 to 3.

cce-REG-MappingType: indicates a control channel element (CCE)-REG mapping type. Interleaved and non-interleaved types are supported.

interleaverSize: indicates an interleaver size.

pdcch-DMRS-ScramblingID: indicates a value used for PDCCH DMRS initialization. When pdcch-DMRS-ScramblingID is not included, the physical cell ID of a serving cell is used.

precoderGranularity: indicates a precoder granularity in the frequency domain.

reg-BundleSize: indicates an REG bundle size.

tci-PresentInDCI: indicates whether a transmission configuration index (TCI) field is included in DL-related DCI.

tci-StatesPDCCH-ToAddList: indicates a subset of TCI states configured in pdcch-Config, used for providing quasi-co-location (QCL) relationships between DL RS(s) in an RS set (TCI-State) and PDCCH DMRS ports.

Further, the BS may transmit a PDCCH search space (SS) configuration to the UE (S504). The PDCCH SS configuration may be transmitted by higher-layer signaling (e.g., RRC signaling). For example, the RRC signaling may include, but not limited to, various types of signaling such as an RRC setup message, an RRC reconfiguration message, and/or BWP configuration information. While a CORESET configuration and a PDCCH SS configuration are shown in FIG. 5 as separately signaled, for convenience of description, the present disclosure is not limited thereto. For example, the CORESET configuration and the PDCCH SS configuration may be transmitted in one message (e.g., by one RRC signaling) or separately in different messages.

The PDCCH SS configuration may include information about the configuration of a PDCCH SS set. The PDCCH SS set may be defined as a set of PDCCH candidates monitored (e.g., blind-detected) by the UE. One or more SS sets may be configured for the UE. Each SS set may be a USS set or a CSS set. For convenience, PDCCH SS set may be referred to as "SS" or "PDCCH SS".

A PDCCH SS set includes PDCCH candidates. A PDCCH candidate is CCE(s) that the UE monitors to receive/detect a PDCCH. The monitoring includes blind decoding (BD) of PDCCH candidates. One PDCCH (candidate) includes 1, 2, 4, 8, or 16 CCEs according to an aggregation level (AL). One CCE includes 6 REGs. Each CORESET configuration is associated with one or more SSs, and each SS is associated with one CORESET configuration. One SS is defined based on one SS configuration, and the SS configuration may include the following information/fields.

searchSpaceId: indicates the ID of an SS.
controlResourceSetId: indicates a CORESET associated with the SS.
monitoringSlotPeriodicityAndOffset: indicates a periodicity (in slots) and offset (in slots) for PDCCH monitoring.
monitoringSymbolsWithinSlot: indicates the first OFDM symbol(s) for PDCCH monitoring in a slot configured with PDCCH monitoring. The first OFDM symbol(s) for PDCCH monitoring is indicated by a bitmap with each bit corresponding to an OFDM symbol in the slot. The MSB of the bitmap corresponds to the first OFDM symbol of the slot. OFDM symbol(s) corresponding to bit(s) set to 1 corresponds to the first symbol(s) of a CORESET in the slot.

nrofCandidates: indicates the number of PDCCH candidates (one of values 0, 1, 2, 3, 4, 5, 6, and 8) for each AL where AL={1, 2, 4, 8, 16}.

searchSpaceType: indicates common search space (CSS) or UE-specific search space (USS) as well as a DCI format used in the corresponding SS type.

Subsequently, the BS may generate a PDCCH and transmit the PDCCH to the UE (S506), and the UE may monitor PDCCH candidates in one or more SSs to receive/detect the PDCCH (S508). An occasion (e.g., time/frequency resources) in which the UE is to monitor PDCCH candidates is defined as a PDCCH (monitoring) occasion. One or more PDCCH (monitoring) occasions may be configured in a slot.

Table 3 shows the characteristics of each SS.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

A CCE-to-REG mapping type is set to one of an interleaved type and a non-interleaved type.

Non-interleaved CCE-to-REG mapping (or localized CCE-to-REG mapping) (FIG. 5): 6 REGs for a given CCE are grouped into one REG bundle, and all of the REGs for the given CCE are contiguous. One REG bundle corresponds to one CCE.

Figure 6:
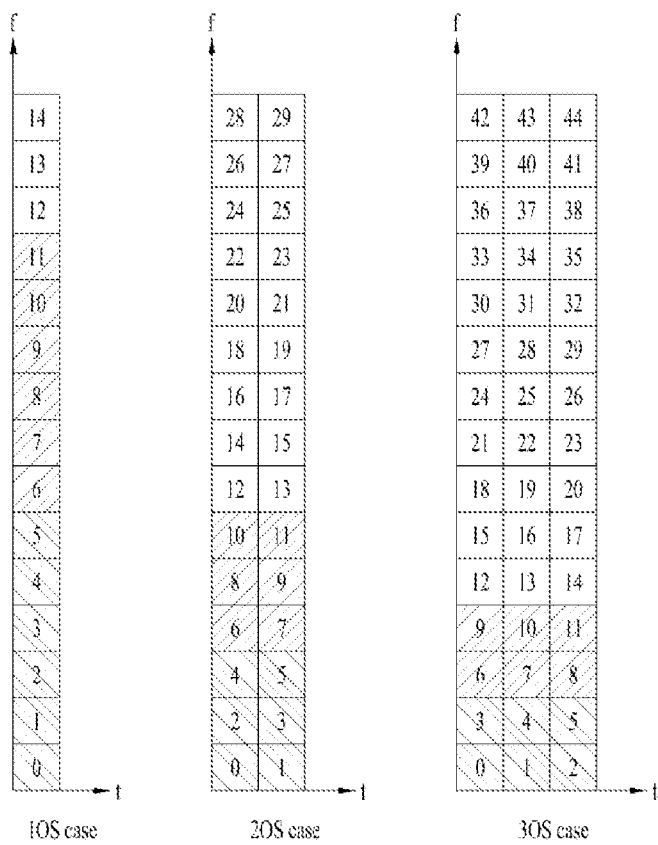
FIGS. 6 and 7 illustrate exemplary control resource set (CORESET) structures.
Figure 7:
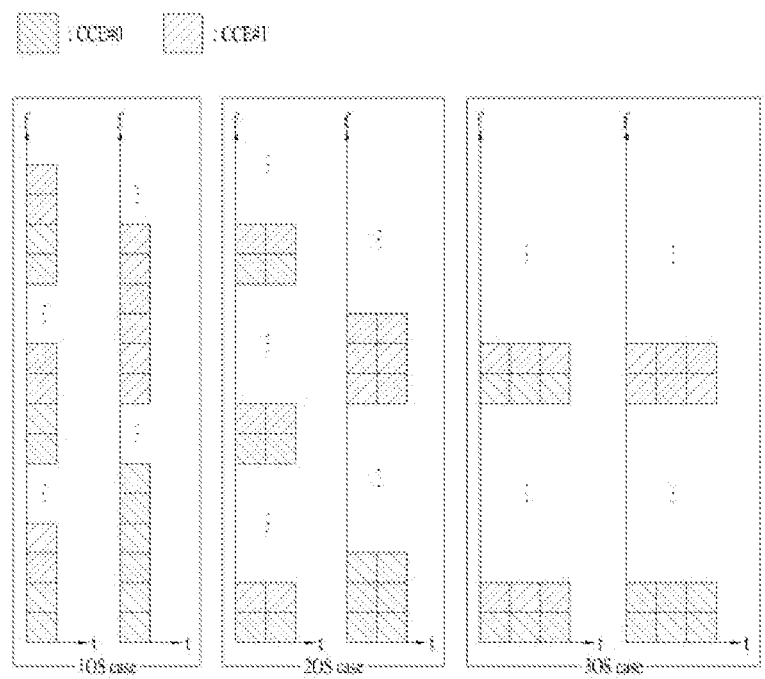

Interleaved CCE-to-REG mapping (or distributed CCE-to-REG mapping) (FIG. 6): 2, 3 or 6 REGs for a given CCE are grouped into one REG bundle, and the REG bundle is interleaved within a CORESET. In a CORESET including one or two OFDM symbols, an REG bundle includes 2 or 6 REGs, and in a CORESET including three OFDM symbols, an REG bundle includes 3 or 6 REGs. An REG bundle size is configured on a CORESET basis.

MBMS (Multimedia Broadcast/Multicast Service)

Next, the MBMS scheme of 3GPP LTE will be described. 3GPP MBMS may be divided into an SFN scheme, in which multiple BS cells are synchronized to transmit the same data on the PMCH, and a single cell point to multipoint (SC-PTM) scheme, in which multiple BS cells are synchronized to broadcast within a corresponding cell coverage on the PDCCH/PDSCH. The SFN scheme is used to provide a broadcast service in a wide area (e.g. MBMS area) through resources pre-allocated semi-statically, while the SC-PTM scheme is mainly used to provide a broadcast service only within a cell coverage through dynamic resources.

The SC-PTM provides one logical channel SC-MCCH (Single Cell Multicast Control Channel) and one or more logical channels SC-MTCHs (Single Cell Multicast Traffic Channels). These logical channels are mapped to a transmission channel DL-SCH and a physical channel PDSCH. The PDSCH carrying SC-MCCH or SC-MTCH data is scheduled on a PDCCH indicated by G-RNTI. In this case, a TMGI corresponding to a service ID may be mapped to a specific G-RNTI value in a one-to-one correspondence manner. Accordingly, when the BS provides a plurality of services, a plurality of G-RNTI values may be allocated for SC-PTM transmission. One or more UEs may perform PDCCH monitoring using a specific G-RNTI to receive a specific service. Here, an SC-PTM dedicated DRX on-duration period may be configured for the specific service/specific G-RNTI. In this case, the UEs wake up only in a specific on-duration period to perform PDCCH monitoring for the G-RNTI.

Frequency Selection for Broadcast and Multicast

The above-described configurations (3GPP system, frame structure, NR system, etc.) may be applied in combination with methods proposed in an embodiment of the present disclosure, or may be supplemented to clarify the technical features of the methods proposed in an embodiment of the present disclosure. As used herein, "I" may mean "and," "or," or "and/or" depending on the context.

In order to access an NR cell, the UE may need to be able to essentially receive MIB and SIB1 on the SSB/PBCH. In addition, it may receive an Other SI (System Information) message (e.g., SIB1) based on initial DL/UL BWP configuration information included in SIB1, TypeOA-PDCCH common search space configuration information, and control resource set (CORESET) configuration information therefor. The Other SI message is not always broadcast, and accordingly a UE in the (RRC) idle/inactive mode may request the Other SI message by triggering RACH in the initial UL BWP. In this case, a specific SI message requested by the RACH preamble may be indicated, or a specific SI message may be requested through an RRC message included in the RACH MSG3 or MSGA. Thereafter, the Other SI message may be received on the PDSCH indicated by the DCI received on a PDCCH occasion of the initial DL BWP. The PDCCH occasion may be based on the TypeOA-PDCCH common search space configuration information and the control resource set (CORESET) configuration information therefor. A UE in the (RRC) connected mode may transmit a specific RRC message through an active UL BWP to request a specific SIB.

The UE in the (RRC) idle/inactive mode may maintain the initial DL/UL BWP until entering the connected mode. The UE receives an RRC Setup message or an RRC Resume message through the initial DL BWP. The message may include configuration information about one or more UE-dedicated BWPs. Upon receiving the UE-dedicated BWP configuration information, the UE may perform DL/UL communication with the BS through the active BWP rather than the initial BWP.

REL-17 NR may intend to introduce a DL broadcast or DL multicast transmission scheme to support the MBMS service. A point-to-multipoint (PTM) transmission scheme such as MBMS enables transmission to multiple UEs with one DL broadcast/multicast, thereby saving radio resources for each UE compared to individual DL unicast transmission (i.e., point-to-point transmission). Therefore, in order to maximize the gain of PTM transmission, UEs in the (RRC) idle/inactive mode and UEs in the (RRC) connected mode may all need to be able to receive the same DL broadcast/multicast transmission.

However, in the NR system, a UE in the (RRC) idle/inactive mode configures an initial DL BWP and a UE in the (RRC) connected mode configures its own active BWP. Accordingly, it is difficult for the BS to provide a specific MBMS service to all UEs through the same DL broadcast/multicast transmission. That is, since the NR BS transmits a specific MBMS service through the active BWPs and the initial BWP for each UE according to the conventional technology, it may not take the advantage of point-to-multipoint transmission scheme.

Accordingly, in an embodiment of the present disclosure, a method for receiving DL broadcast/multicast transmission by a UE through specific frequency resources (e.g., frequency band, bandwidth part, and common frequency resource) may be proposed.

Hereinafter, DL/UL BWP(s) is assumed as an example of a frequency band related to the MBMS service. However, the present disclosure is not limited to the term "BWP" and the term DL/UL BWP(s) may be interpreted as intended to cover various frequency sizes/resources corresponding to parts of the entire DL/UL frequency band. For example, a UE-common (BWP frequency) resource on which the MBMS service is provided may be referred to simply as a common frequency resource (CFR).

A UE may configure a first DL BWP and a first UL BWP, wherein the UE can perform initial access or a transmission dedicated to the UE by using the first DL BWP and/or the first UL BWP.

The first DL BWP may be an initial DL BWP or an active DL BWP.

The first UL BWP may be an initial UL BWP or an active UL BWP.

The UE may receive configuration of one or more particular DL BWPs for broadcast/multicast services from a second DL BWP, wherein the first DL BWP may be equal to or different than the second DL BWP, and the DL BWP configuration may provide information regarding mapping/association between one or more specific DL BWPs and one or more broadcast/multicast services.

The UE may receive the DL BWP configuration by UE-dedicated signaling or a MBMS control information common to multiple UEs.

If the UE is interested to receive a PDSCH transmission related to at least one of the broadcast/multicast services, the UE may select and activate one of the specific DL BWP(s) based on the mapping/association and may receive the PDSCH transmission from the selected specific DL BWP that is equal to or different than one or both of the first DL BWP and the second DL BWP.

If HARQ feedback is enabled for the PDSCH transmission mapped to a specific UL BWP, the UE may select and activate the specific UL BWP and transmit HARQ feedback over the specific UL BWP, in response to the PDSCH transmission, wherein the specific UL BPW may be equal to or different than the first UL BWP and mapping from the PDSCH transmission to the specific UL BWP may be indicated by a downlink control information associated to the PDSCH transmission.

The downlink control information may be a DCI on PDCCH, a MAC control element (CE) or an RRC message carrying the configuration.

In addition, a method for transmitting, by the BS, DL broadcast/multicast transmissions over specific frequency resources (e.g., frequency band, bandwidth part, common frequency resource) may be proposed.

The BS may provide a first DL BWP and a first UL BWP, wherein one or more UEs may perform initial access or UE-dedicated transmissions by using the first DL BWP and/or the first UL BWP.

The first DL BWP may be an initial DL BWP or an active DL BWP.

The first UL BWP may be an initial UL BWP or an active UL BWP.

The BS may provide the UE(s) with configuration of one or more particular DL BWPs for broadcast/multicast services from a second DL BWP, wherein the first DL BWP can be equal to or different than the second DL BWP, and the configuration may provide mapping/association between one or more specific DL BWPs and one or more broadcast/multicast services.

The configuration may be provided by UE-dedicated signaling or a MBMS control information common to the UEs.

The BS may select and activate one of the specific DL BWP(s) for at least one of the broadcast/multicast services based on the mapping/association, and may perform a PDSCH transmission related to the broadcast/multicast service.

The selected specific DL BWP is equal to or different than one or both of the first DL BWP and the second DL BWP.

The BS may select and activate one or more specific UL BWPs, and may enable HARQ feedback mapped/associated to the specific UL BWP(s) for the PDSCH transmission by enabling HARQ feedback via downlink control information associated to the PDSCH transmission.

Mapping/association from the PDSCH transmission to the specific UL BWP(s) can be indicated by a downlink control information associated to the PDSCH transmission. The downlink control information may be DCI on PDCCH, a MAC Control Element or a RRC message carrying the configuration.

The BS may receive one or more HARQ feedbacks over the specific UL BWP(s) from one or more of the UEs, in response to the PDSCH transmission, wherein each of the specific UL BPW(s) may be equal to or different than the first UL BWP.

Transmission Side (e.g., BS):

When a cell is configured to broadcast an MBMS service, the BS may transmit SIB1, an MBMS SIB, one or more MCCHs, and/or one or more MTCHs. Here, the MCCH and the MTCH, which are logical channels, may be transmitted on a physical channel, PDSCH. The PDSCH carrying MCCH/MTCH may be scheduled on the PDCCH. The MCCH may carry service control information (MBMS control information), and one MTCH may carry specific MBMS service data.

The BS may provide BWP(s) for MBMS (hereinafter, MBMS BWP(s)) to UEs. The MBMS BWP(s) may include at least one of an MBMS SIB DL BWP and MBMS SIB UL BWP for MBMS SIB transmission and reception, an MCCH DL BWP and MCCH UL BWP for MCCH transmission and reception, and an MTCH DL BWP and/or MTCH UL BWP for MTCH transmission and reception. One cell may provide zero or one or more MBMS DL BWPs and zero or one or more MBMS UL BWPs. Accordingly, a BS supporting MBMS may provide all the above-mentioned MBMS BWP types separately from the conventional initial BWP or UE-dedicated BWP, or may provide only zero or some MBMS BWP(s). Some or all MBMS BWPs may be equal to or different from the conventional initial BWP, a default BWP, a first active BWP, or an active BWP.

Figure 8:
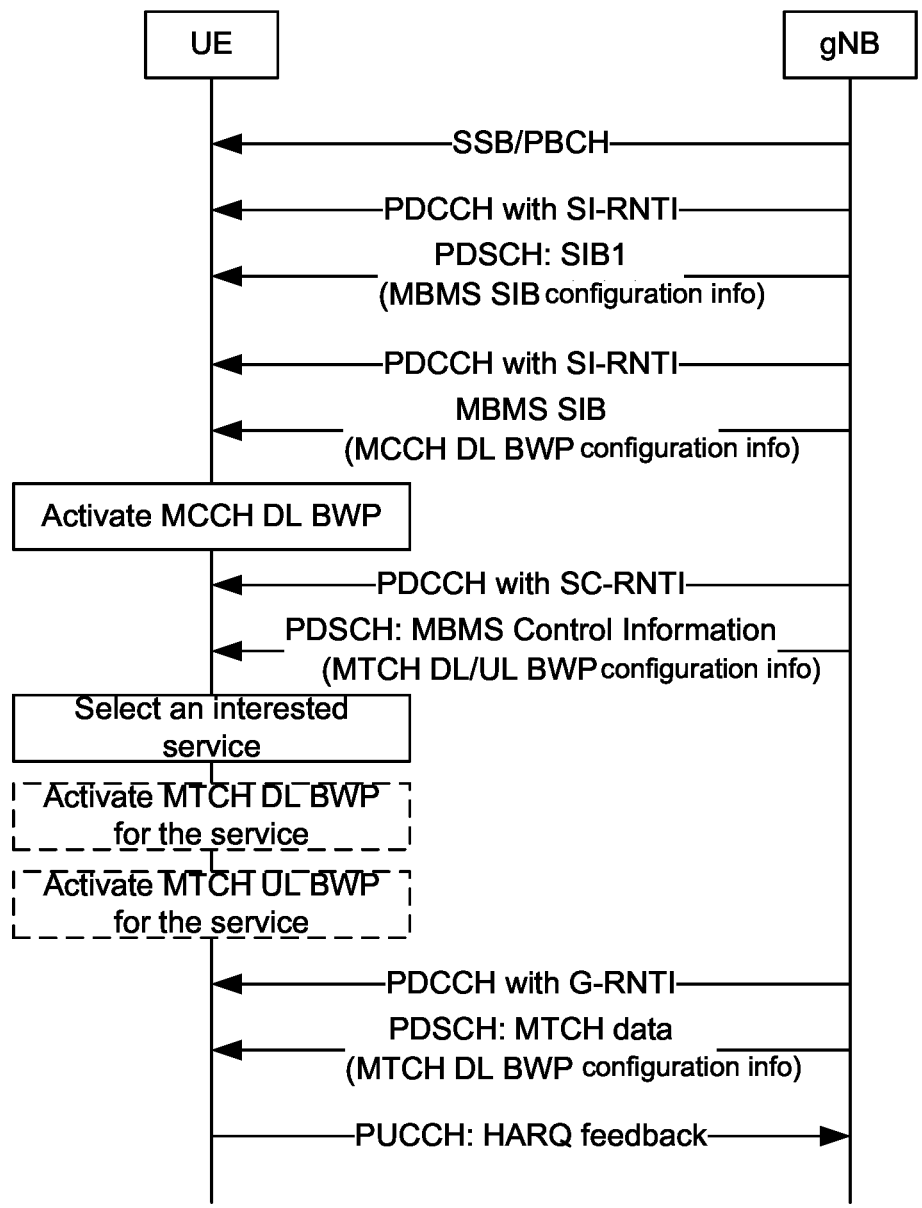
FIG. 8 illustrates a method of configuration and activating an MBMS DL/UL BWP according to an embodiment of the present disclosure.

FIG. 8 illustrates a method of configuring and activating an MBMS DL/UL BWP according to an embodiment of the present disclosure.

For example, the BS may transmit SIB1 and the MBMS SIB through the initial DL BWP, and may transmit the PDCCH/PDSCH for the MCCH and the MTCH through the initial DL BWP or a separate DL BWP (hereinafter referred to as an MBMS DL BWP). Alternatively, the MBMS SIB may also be transmitted through the MBMS SIB_DL BWP. In addition, the UE may separately configure the MBMS SIB_UL BWP for requesting the MBMS SIB in an on-demand manner.

The MBMS SIB may deliver at least one of separate MCCH DL/UL BWP configuration information for one or more MCCHs and PDCCH CSS set configuration information for transmitting the MCCH. In addition, the MBMS SIB or service control information (e.g., MBMS control information) may deliver at least one of separate MTCH DL/UL BWP configuration information for one or more MTCHs and PDCCH MSS set configuration information for transmitting the MTCH.

The MBMS BWP configuration information may include information about the frequency position, bandwidth size, and/or SCS of the corresponding BWP. The MBMS BWP may be included in the same cell as the initial BWP, or may be included in a different cell (hereinafter, referred to as an MBMS SCell). A UE intending to receive the MBMS service may receive the PDCCH/PDSCH for transmission of MCCH/MTCH data by configuring the MBMS BWP and the MBMS SCell, regardless of the RRC mode of the UE. The BS may transmit service control information (e.g., MBMS control information) to the UE in the (RRC) connected mode through UE-dedicated signaling.

A BS providing the MBMS may broadcast at least some of the following information in the cell.

Figure 9:
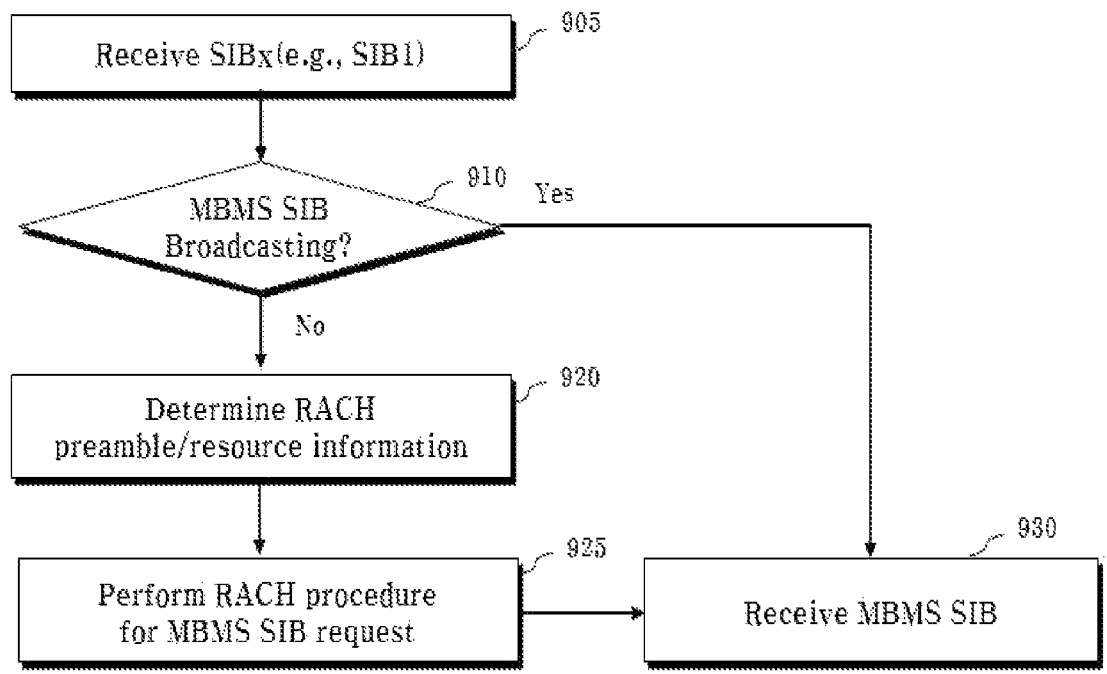
FIG. 9 illustrates an MBMS SIB request that is made in an on-demand manner according to an embodiment of the present disclosure.

Information contained in SIBx (e.g., SIB1)

a. Information indicating whether the MBMS SIB is being broadcast may be provided.

b. Information for instructing the UE to use the TypeOA-PDCCH CSS set to receive the MBMS SIB or configuration information for a new CORSET and PDCCH CSS set type for receiving the MBMS SIB may be provided.

c. When the MBMS SIB and the MCCH/MTCH transmission are transmitted through a DL BWP different from the initial DL BWP, configuration information about the DL BWP for the MBMS may be provided.

d. A specific RNTI (e.g., G-RNTI or single cell-RNTI) value(s) for one or more MCCHs may be provided. A specific RNTI (e.g., G-RNTI, or SC-RNTI) of a different value may be provided for each MCCH. For example, a specific RNTI value may be allocated/configured differently/independent for each MBMS service (ID).

e. An indication of whether the MBMS SIB is currently being broadcast and a RACH preamble and/or RACH resource information for requesting the MBMS SIB in an on-demand manner when not broadcast may be provided.

i. The BS may indicate that RACH transmission for requesting the MBMS SIB in the on-demand manner should be performed through the initial UL BWP. Alternatively, the BS may indicate that the RACH transmission for requesting the MBMS SIB in the on-demand manner is performed at a UL BWP (e.g., UL BWP for MBMS) different from the initial UL BWP, and may provide corresponding UL BWP configuration information through SIB1.

ii. FIG. 9 illustrates an MBMS SIB request that is made in an on-demand manner according to an embodiment of the present disclosure. The UE receives SIBx (e.g., SIB1) (905). The UE may determine whether the MBMS SIB is currently broadcast based on the SIBx (e.g., SIB1). For example, when the MBMS SIB is not broadcast, the UE may acquire RACH preamble information and/or RACH resource information from SIBx (e.g., SIB1). The UE may perform RACH transmission using a RACH preamble and/or a RACH resource indicated by SIBx (e.g., SIB1) (925). When instructed to use the initial UL BWP for the MBMS, the UE may perform RACH transmission through the initial UL BWP. When separate UL BWP configuration information for the MBMS is provided, the UE may configure and activate a corresponding UL BWP to perform RACH transmission. The UE may deactivate the initial UL BWP, operate two UL BWPs simultaneously in the time domain, or operate two UL BWPs in different time periods by switching the BWPs on a TDM basis.

Information included in MBMS SIB a. MBMS related DL frequency resources(s) (e.g, DL BWP) configuration information i. Information about the frequency position, the bandwidth size, and/or SCS related to the DL BWP for transmission of the PDCCH/PDSCH for the MCCH/MTCH may be provided.

ii. A UE intending to receive the MBMS service may receive the configuration information and activate the MBMS DL BWP. At this time, the UE may deactivate the initial DL BWP, or may receive the initial DL BWP and the MBMS DL BWP simultaneously, or receive the initial DL BWP at a different time from the MBMS DL BWP. Here, the MBMS DL BWP for transmission/reception of MCCH data is an MCCH_DL BWP, and may be equal to or different from the MTCH_DL BWP for transmission/reception of MTCH data.

b. PDCCH CSS set configuration information for scheduling of MCCH data transmission i. The MCCH may carry service control information (e.g., MBMS control information), and the UE may receive, through a new PDCCH CSS set type, DCI for scheduling the service control information (e.g., MBMS control information) on the MCCH. To this end, the UE may receive PDCCH CSS set configuration information through the MBMS SIB, and monitor the corresponding PDCCH CSS set to receive DCI for scheduling of the MCCH. In this case, the CRC of the DCI may be scrambled with a specific RNTI (e.g., G-RNTI, or SC-RNTI).

ii. The UE may monitor PDCCH through the CSS and receive DCI in which the CRC is scrambled using a specific RNTI (e.g., G-RNTI, or SC-RNTI). The UE may receive the PDSCH transmission indicated by the DCI, thereby receiving service control information (e.g., MBMS control information) carried by the MCCH iii. CSS for scheduling/transmitting service control information (e.g., MBMS control information) on the MCCH may be replaced by a MBMS-dedicated search space (hereinafter referred to as MSS) or USS.

c. A time/frequency resource pool through which one or more MCCHs may be transmitted may be provided. The resource pool may be configured (differently) for each MCCH BWP or for each cell.

i. A UE with an MCCH BWP configured may expect PDCCH/PDSCH transmission for MCCH TB to occur only in the resource pool, and consider that the transmission will not occur outside the resource pool.

ii. The resource pool may be configured with the initial BWP or active BWP of UE in the TDM/FDM/SDM scheme.

Figure 10:
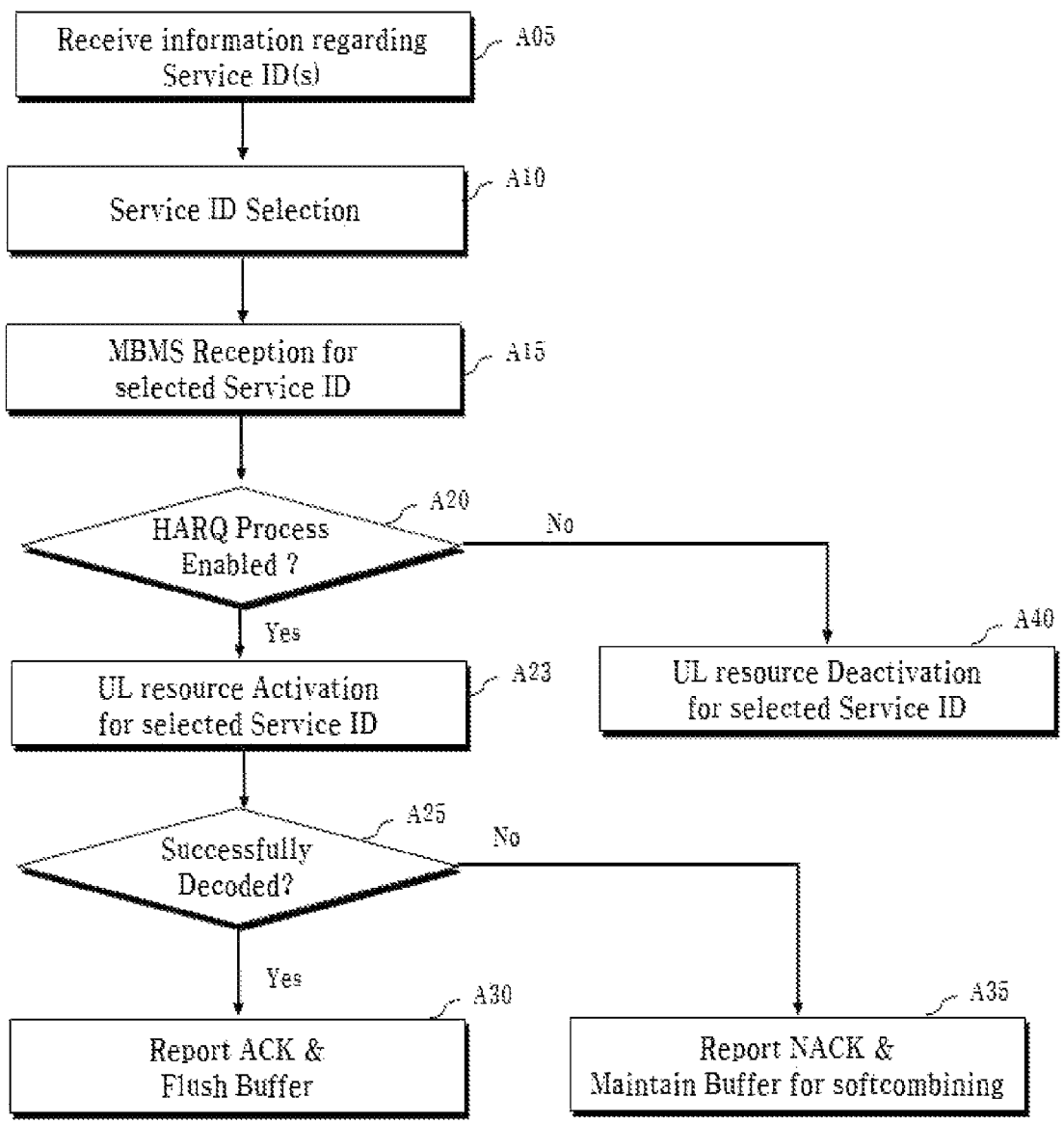
FIG. 10 illustrates an MBMS-related HARQ feedback according to an embodiment of the present disclosure.

Contents of service control information (e.g., MBMS control information) carried by MCCH a. The BS may provide configuration information about one or more DL BWPs.

i. Here, the DL BWP may be associated with one of the initial DL BWP, the MBMS DL BWP, or the active BWP of the UE. In this case, the MBMS DL BWP for MTCH data transmission and reception is an MTCH_DL BWP and may be the same as or different from the MCCH_DL BWP for MCCH data transmission and reception.

b. The BS may provide an MBMS service ID list (e.g., temporary mobile group identity (TMGI) list) for each DL BWP.

i. The BS may inform the UE of an ID of at least one MBMS service transmitted through a specific DL BWP. Each MBMS service ID may be mapped to/associated with a specific MTCH. The corresponding MBMS service data (e.g., the mapped specific MTCH) may be transmitted on the PDSCH.

ii. The UE may activate the DL BWP through which the MBMS service to be received is transmitted, and may receive MBMS service data through the DL BWP.

c. The BS may provide a G-RNTI mapped to/associated with the MBMS service ID. G-RNTI may be mapped to/associated with each MBMS service ID.

d. The BS may inform whether HARQ feedback transmission (e.g., the HARQ process for HARQ-ACK reporting) (for PDSCH transmission carrying the corresponding MBMS service data) is enabled/disabled for each MBMS service ID.

e. The BS may provide PUCCH resource (set) configuration information for HARQ feedback transmission or CSI transmission for MBMS for each MBMS service ID.

f. The BS may provide uplink resource configuration (e.g., MBMS UL BWP configuration information) for HARQ feedback transmission or CSI transmission for MBMS for each MBMS service ID.

i. When HARQ feedback transmission for a MBMS service is activated, the UE intending to receive corresponding specific MBMS service data may activate the MBMS UL BWP mapped to/associated with the MBMS service and transmit HARQ feedback through the MBMS UL BWP. The MBMS-related HARQ feedback of the UE may be allowed/performed only when HARQ feedback transmission is indicated to be activated for the corresponding MBMS service ID.

ii. FIG. 10 illustrates an MBMS-related HARQ feedback according to an embodiment of the present disclosure. Referring to FIG. 10, the UE may receive information on at least one service ID from the BS (A05). The UE selects a service ID of a service to be received from among the at least one service ID (A10). The UE may perform MBMS reception based on the selected service ID (A15). If the HARQ process is enabled in relation to the selected service ID (A20, Yes), the UE may configure/activate an uplink frequency resource (e.g., a UL resource for HARQ feedback) associated with the selected service ID (A23). The UE which successfully decodes the MBMS reception may transmit an ACK and flush the corresponding HARQ buffer (A30). The UE which fails to decode the MBMS reception may transmit a NACK and maintain the HARQ buffer for soft combining (A35).

g. The BS may provide search space set configuration information mapped to/associated with the MBMS service ID.

i. The BS may map/associate one or more MBMS service IDs to/with a specific MBMS search space set (hereinafter, referred to as an MSS set). In an embodiment of the present disclosure, the MSS may be a new type of CSS or USS, or may be defined as a new type of search space other than the CSS/USS type. Configuration information about a search space set associated with each MBMS service ID may be provided.

ii. The UE may activate the DLBWP through which the MBMS service to be received is transmitted, and monitor the PDCCH through a specific MSS set mapped to/associated with the MBMS service.

iii. The UE may monitor the PDCCH through the MSS and receive DCI in which the CRC is scrambled using a G-RNTI mapped to/associated with the MBMS service. The UE may receive the MBMS service data by receiving the PDSCH transmission indicated by the DCI.

iv. The G-RNTI-based DCI may indicate HARQ feedback through PUCCH or PUSCH. When the G-RNTI-based DCI indicates HARQ feedback and HARQ feedback transmission for the MBMS service is enabled, the UE may activate the MBMS UL BWP mapped to the MBMS service and transmit the HARQ feedback through the MBMS UL BWP.

h. The BS may provide a time/frequency resource pool through which one or more MTCHs may be transmitted. The resource pool may be configured differently for each MTCH BWP or for each cell.

i. A UE with an MTCH BWP configured may expect PDCCH/PDSCH transmission for MTCH TB(s) to occur only in the resource pool, and consider that the PDCCH/PDSCH transmission will not occur outside the resource pool.

ii. The resource pool may be configured with the initial BWP or active BWP of UE in the TDM/FDM/SDM scheme.

Receiving Side (e.g., UE):

A UE in the (RRC) idle/inactive mode may measure the SSB of a cell to determine the quality of the cell. When multiple cells are obtained through the search, a cell having the best quality (i.e., the highest RSRP measurement value) may be selected from among the cells. The UE may receive the MIB and the SIB1 from the selected cell and camp on the same. Thereafter, it may receive an Other SI message.

Receiving MBMS SIB Based on SIBx (e.g., SIB1)

A UE intending to receive a specific MBMS service may determine whether the MBMS SIB is supported through SIB1. Upon determining that a cell selected by the UE supports the MBMS SIB, the UE may acquire CSS configuration information for receiving the MBMS SIB from SIB1. For example, the SIB1 may instruct the UE to use the Type0A-PDCCH CSS set or may provide configuration information for a new CORSET and PDCCH CSS set type for receiving the MBMS SIB.

The UE may monitor the PDCCH through the CSS and receive DCI in which the CRC is scrambled with the SI-RNTI. The UE may acquire the MBMS SIB by receiving the PDSCH transmission indicated by the DCI. Here, the SI-RNTI may be configured as an MBMS SIB-dedicated RNTI, and may have a value different from that of the existing SI-RNTI for scheduling the Other SI message. The dedicated SI-RNTI may be indicated through SIB1 or UE-dedicated signaling. Alternatively, the MBMS SIB may share the same SI-RNTI with the existing Other SI.

The UE may receive MBMS BWP configuration information for MBMS reception from SIB1. For example, the MBMS BWP configuration information may be configured as shown in Table 5.

TABLE 5

BWP information element
BWP ::= SEQUENCE {
locationAndBandwidth INTEGER (0..37949),
subcarrierSpacing SubcarrierSpacing,
cyclicPrefix ENUMERATED { extended } OPTIONAL - - Need R
}

For example, the UE may receive MBMS SIB BWP configuration information through the SIB. It may be indicated whether the MBMS SIB is currently being broadcast. If the MBMS SIB is not being broadcast, the UE may make a request to the BS for MBMS SIB transmission using the RACH preamble and/or RACH resource mapped to/associated with the MBMS SIB. The BS may indicate, through SIB1, that the RACH transmission for request for the MBMS SIB transmission is performed through the initial UL BWP. Alternatively, the BS may indicate, through SIB1, that the RACH transmission for request for the MBMS SIB transmission SIB1 is performed through a UL BWP (e.g., MBMSBI UL BWP) different from the initial UL BWP.

The UE intending to receive a specific MBMS service may activate the MBMS SIB_DL BWP. When SIB1 configures an MBMS SIB dedicated CSS set or a Type0A PDCCH CSS set, the UE may monitor the PDCCH occasion in the CSS set of the activated MBMS SIB_DL BWP. The UE may receive the DCI on the PDCCH. When the CRC of the DCI is scrambled with a specific SI-RNTI, the UE may receive the PDSCH transmission indicated by the DCI. The UE may receive the MBMS SIB on the received PDSCH. When SIB1 or the DCI indicates HARQ feedback and a RACH preamble/resource or PUCCH resource for the same is allocated, the UE may determine whether to transmit HARQ-ACK information (e.g., ACK/NAK) through the MBMS SIB_UL BWP, depending on the result of decoding of the TB including the MBMS SIB (or may determine whether to transmit a NACK). The UE may transmit the determined HARQ feedback through the RACH or UCI (e.g., PUCCH or PUSCH). When the BS receives the NACK, it may retransmit the MBMS SIB. The UE transmitting the NACK may receive the retransmitted MBMS SIB and transmit the HARQ feedback again. The MBMS SIB_UL BWP is the same as or different from the initial UL BWP, a default UL BWP, or an active UL BWP.

Receiving MCCH Based on MBMS SIB

The UE may receive MCCH BWP configuration information for one or more MCCHs and/or specific RNTI (e.g., G-RNTI, or SC-RNTI) configuration through the MBMS SIB. One MCCH BWP may be used for transmitting and receiving one or more MCCHs. Different MCCHs may be mapped to different MCCH BWPs and transmitted/received. Different MCCHs mapped to the same MCCH BWP may be set to different values of the specific RNTI (e.g., G-RNTI, or SC-RNTI).

The UE may select and activate one or more MCCH_DL BWPs according to the received information. In this case, an MCCH_DL BWP may be mapped to one or more MBMS services. Accordingly, the UE may select and activate an MCCH and MCCH_DL BWP to which the service to be received is mapped. Thereafter, when no service is received through the MCCH and the MCCH_DL BWP, the UE may deactivate the MCCH_DL BWP.

When SIB1 or MBMS SIB configures a new type of PDCCH CSS set for MCCH, the UE may monitor a PDCCH occasion in the CSS set of the activated MCCH_DL BWP. The UE may receive DCI on the PDCCH. When the CRC of the DCI is scrambled with a specific RNTI (e.g., G-RNTI, or SC-RNTI), the UE may receive the PDSCH transmission indicated by the DCI. The UE may receive service control information (e.g., MBMS control information) on the MCCH through the received PDSCH. When the SIB1, MBMS SIB or DCI indicates HARQ feedback and a RACH preamble/resource or PUCCH resource for the same is allocated, the UE may determine whether to transmit HARQ-ACK information (e.g., ACK/NACK) through the MCCH_UL BWP (e.g., MBMS control information) (or determine whether to transmit a NACK) according to the result of decoding of the MCCH TB including the service control information (e.g., MBMS control information). The UE may transmit the determined HARQ feedback through the RACH or UCI (e.g., PUCCH or PUSCH). When the BS receives the NACK, the BS may retransmit the MCCH TB. The UE transmitting the NACK may receive the retransmitted MCCH TB and transmit the HARQ feedback again. The MCCH_UL BWP is the same as or different from the initial UL BWP, a default UL BWP, or an active UL BWP.

Receiving MTCH Data Based on MCCH Control Information

The UE may receive an MCCH TB. The MCCH TB contains service control information (e.g., MBMS control information). The UE may acquire one or more MBMS service IDs (e.g., TMGI list), MTCH BWP configuration information for one or more MTCHs, G-RNTI configuration, and the like through the service control information (e.g., MBMS control information). An MTCH BWP may be used for transmission and reception of one or more MTCHs. Different MTCHs may be mapped to different MTCH BWPs and transmitted and received. Different MTCHs mapped to the same MTCH BWP may be set to different G-RNTI values. An MTCH may support transmission of an MBMS service ID.

The UE may select and activate one or more MTCH_DL BWPs according to the received information. In this case, an MTCH_DL BWP may be mapped to one or more MBMS services. Accordingly, the UE may select and activate an MTCH and MTCH_DL BWP to which the service to be received is mapped. Thereafter, when no service is received through the MTCH and the MTCH_DL BWP, the UE may deactivate the MTCH_DL BWP.

When SIB1, MBMS SIB, or service control information (e.g., MBMS control information) configures a new type of PDCCH MSS set for MTCH, the UE may monitor a PDCCH occasion in the MSS set of the activated MTCH_DL BWP. The UE may receive DCI on the PDCCH. When the CRC of the DCI is scrambled with a specific G-RNTI, the UE may receive the PDSCH transmission indicated by the DCI. The specific G-RNTI may be mapped to/associated with an MBMS service ID to be received by the UE. The UE may receive MTCH data through the received PDSCH. When the SIB1, MBMS SIB, service control information (e.g., MBMS control information), or DCI indicates HARQ feedback and a RACH preamble/resource or PUCCH resource for the same is allocated, the UE may determine whether to transmit HARQ-ACK information (e.g., ACK/NACK) through the MTCH_UL BWP (e.g., MBMS control information) (or determine whether to transmit a NACK) according to the result of decoding of the MTCH TB. The UE may transmit the determined HARQ feedback through the RACH or UCI (e.g., PUCCH or PUSCH). When the BS receives the NACK, the BS may retransmit the MTCH TB. The UE transmitting the NACK may receive the retransmitted MTCH TB and transmit the HARQ feedback again. The MTCH_UL BWP may be the same as or different from the initial UL BWP, a default UL BWP, or an active UL BWP.

In an embodiment of the present disclosure, a separate BWP for MBMS may be configured in an NR system, thereby maximizing advantages of a PTM transmission method for transmitting the same MBMS TB to multiple UEs.

Figure 11:
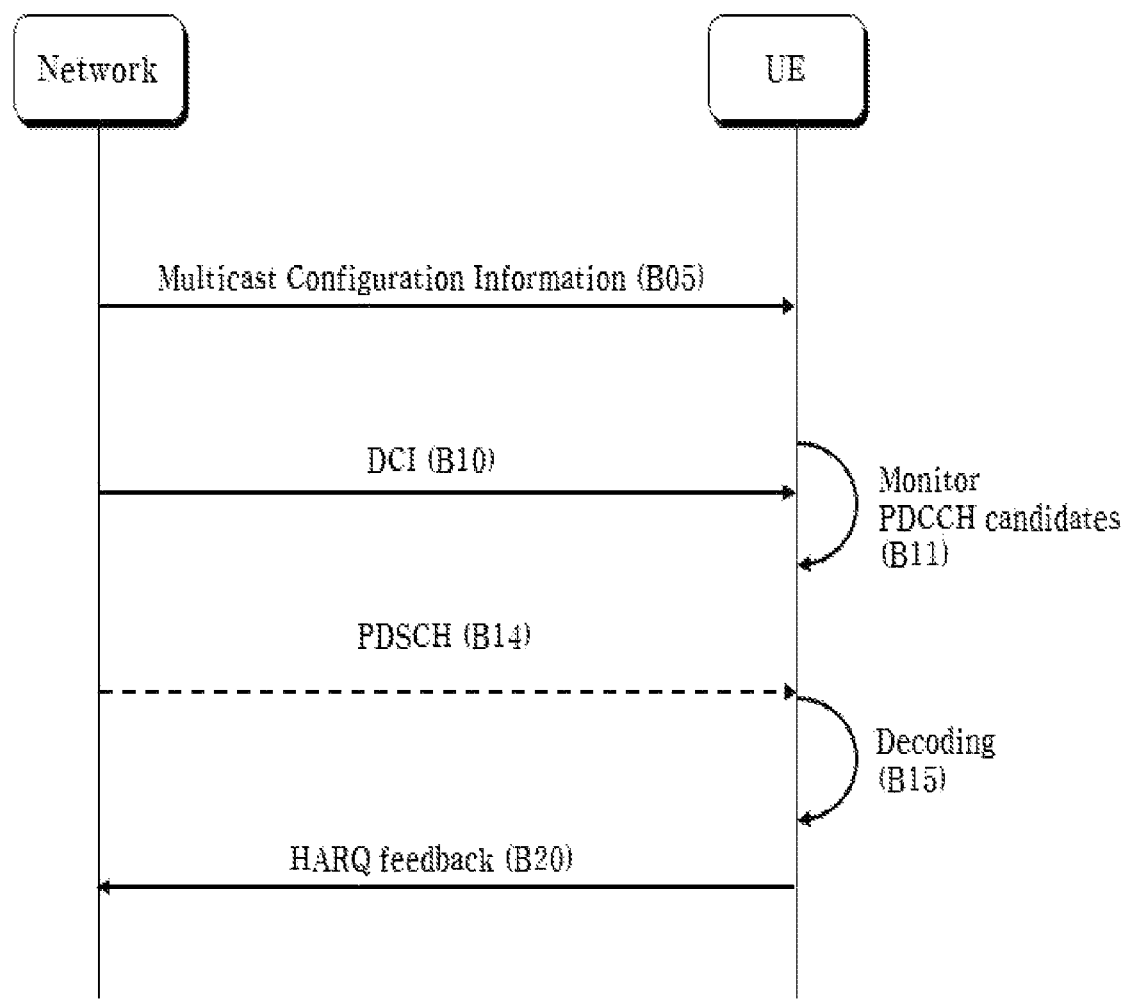
FIG. 11 illustrates a signal transmission/reception method according to an embodiment of the present disclosure.

FIG. 11 illustrates a signal transmission/reception method according to an embodiment of the present disclosure.

Referring to FIG. 11, the UE may receive multicast configuration information including a group-radio network temporary identifier (G-RNTI) and an indicator indicating whether a hybrid automatic repeat request (HARQ) process related to at least one downlink multicast service is enabled (B05).

The UE may receive downlink control information (DCI) whose cyclic redundancy check (CRC) is scrambled with the G-RNTI on a specific downlink frequency resource (B10).

The BS may transmit a physical downlink shared channel (PDSCH) including a multicast transport block (TB) based on the DCI (B14).

The UE may perform decoding of the multicast TB carried by the PDSCH based on the DCI (B15).

Based on that the indicator included in the multicast configuration information indicates enabling of the HARQ process, the UE may transmit, on a specific uplink frequency resource, information about a result of decoding of the multicast TB through a physical uplink control channel (PUCCH) resource indicated by the DCI (B20). Based on that the indicator included in the multicast configuration information indicates enabling of the HARQ process, the BS may receive a HARQ-ACK (acknowledgement) report on the multicast TB from the UE through the PUCCH resource indicated by the DCI on the specific uplink frequency resource.

A service ID may be configured for each of the at least one downlink multicast service.

The multicast configuration information may provide a G-RNTI and an indicator for each service ID.

Each of the specific downlink frequency resource and the specific uplink frequency resource may be related to an active bandwidth part (BWP), an initial BWP, or a default BWP of the UE.

The at least one downlink multicast service may be a multicast and broadcast service (MBMS) based on 3GPP (3rd generation partnership project). The multicast configuration information may provide uplink resource configuration information for performing at least one of HARQ-ACK (acknowledge) reporting and MBMS-related channel state information (CSI) reporting for each MBMS service ID. The uplink resource configuration information included in the multicast configuration information may be related to PUCCH resource configuration information or uplink bandwidth part (BWP) configuration information.

The UE may receive the DCI by monitoring the PDCCH in a search space associated with a service ID of a downlink multicast service to be received by the UE. The UE may select an associated search space from among one or two or more search spaces configured for the UE, based on the service ID.

Transmitting information on the result of decoding of the multicast TB may be performed only when enabling of the HARQ process is indicated for the downlink multicast service.

The multicast configuration information may be received through higher layer signaling.

The multicast TB may include multicast traffic channel (MTCH) data of the downlink multicast service.

Various descriptions, functions, procedures, proposals, methods, and/or operational flow charts of the present disclosure may be applied to, but not limited to, various fields requiring wireless communication/connection (e.g., 5G) between devices.

With reference to the drawings, the present disclosure will be described in greater detail. In the following drawings/description, like reference numerals may denote the same or corresponding hardware blocks, software blocks, or functional blocks, unless otherwise specified.

Figure 12:
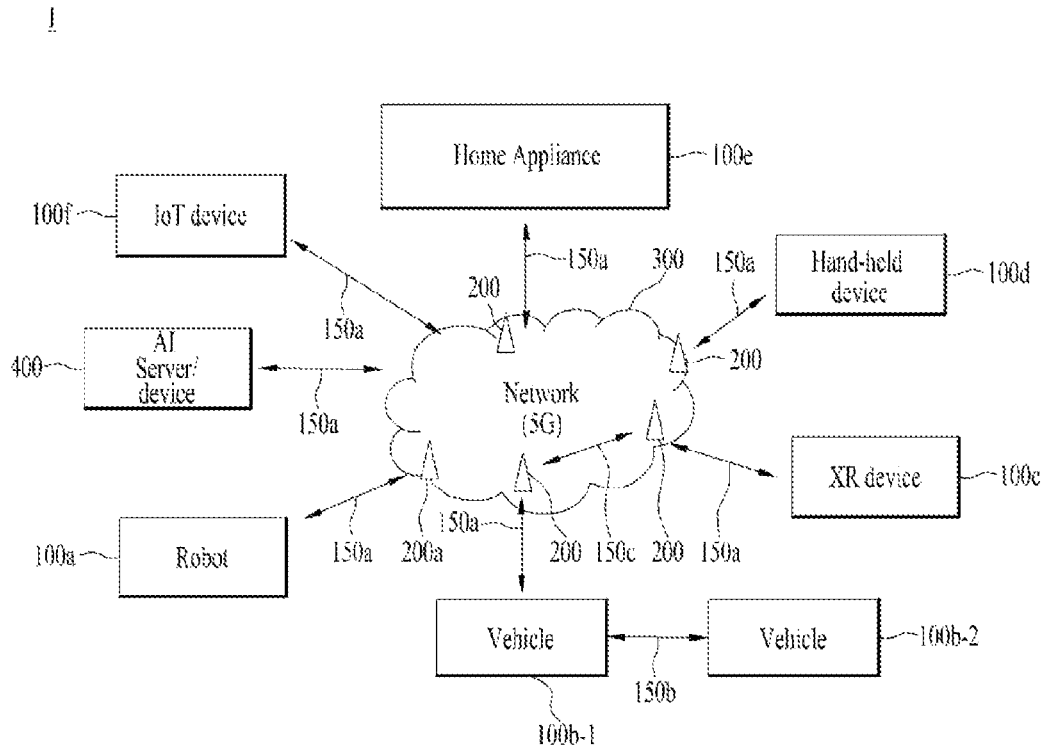
FIGS. 12 to 15 illustrate a communication system 1 and a wireless device applicable to the present disclosure.

FIG. 12 illustrates a communication system 1 applied to the present disclosure.

Referring to FIG. 12, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 13:
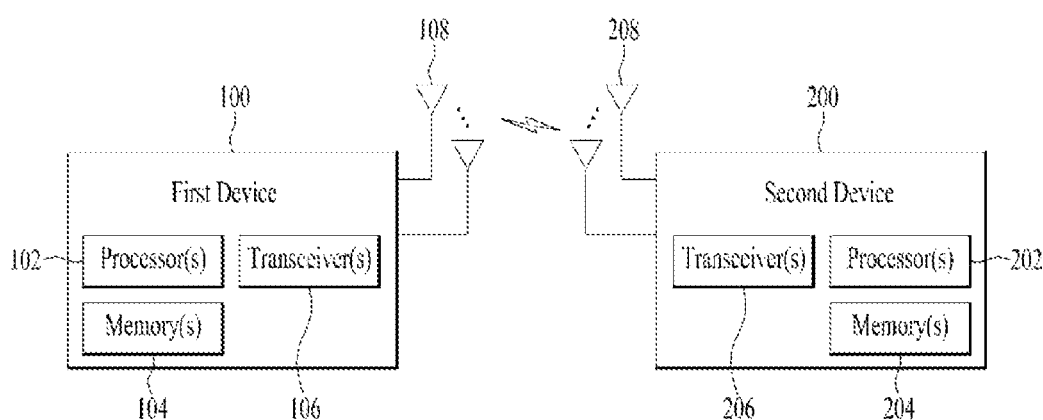

FIG. 13 illustrates wireless devices applicable to the present disclosure.

Referring to FIG. 13, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 18.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 14:
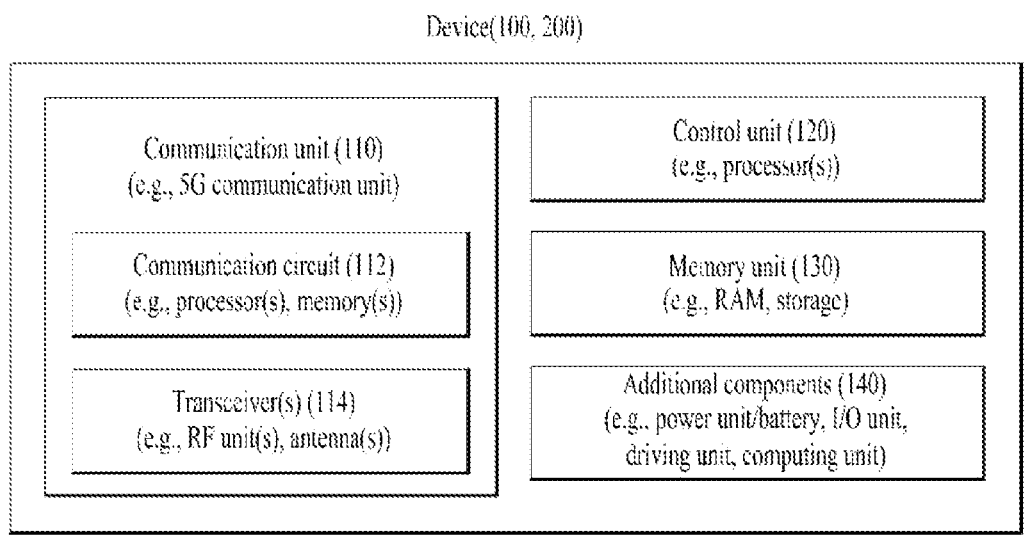

FIG. 14 illustrates another example of a wireless device applied to the present disclosure. The wireless device may be implemented in various forms according to a use-case/service (refer to FIG. 12).

Referring to FIG. 14, wireless devices 100 and 200 may correspond to the wireless devices 100 and 200 of FIG. 13 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 13. For example, the transceiver(s) 114 may include the one or more transceivers 106 and 206 and/or the one or more antennas 108 and 208 of FIG. 13. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 18), the vehicles (100b-1 and 100b-2 of FIG. 18), the XR device (100c of FIG. 18), the hand-held device (100d of FIG. 18), the home appliance (100e of FIG. 18), the IoT device (100f of FIG. 18), a digital broadcast terminal, a hologram device, a public safety device, an MTC device, a medicine device, a fintech device (or a finance device), a security device, a climate/environment device, the AI server/device (400 of FIG. 18), the BSs (200 of FIG. 18), a network node, etc. The wireless device may be used in a mobile or fixed place according to a use-example/service.

In FIG. 14, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 15:
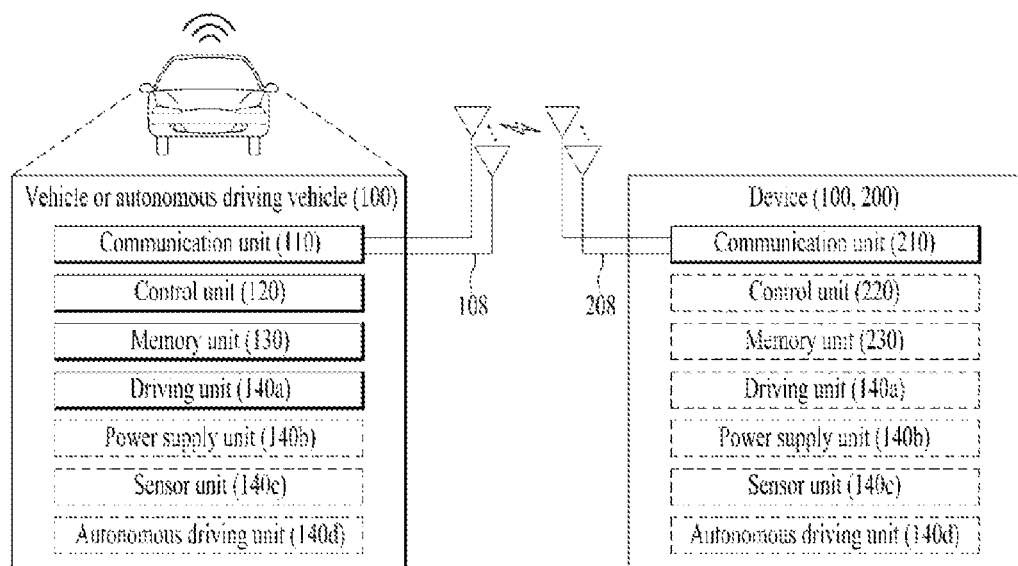

FIG. 15 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 15, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 14, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 16:
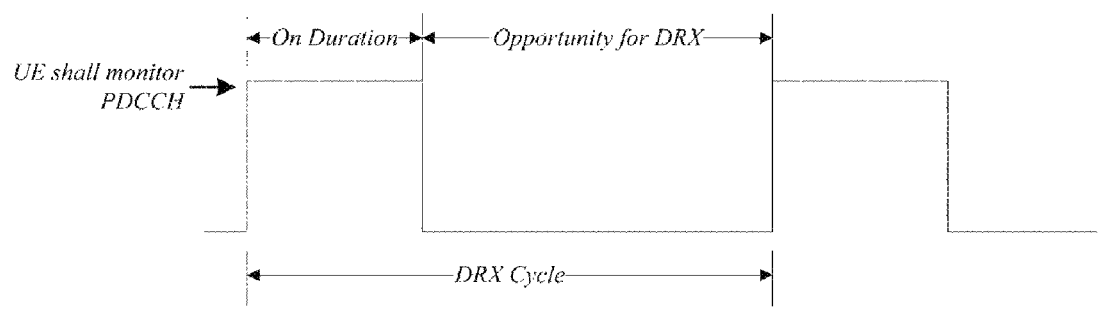
FIG. 16 illustrates a discontinuous reception (DRX) operation applicable to the present disclosure.

FIG. 16 is a diagram illustrating a DRX operation of a UE according to an embodiment of the present disclosure.

The UE may perform a DRX operation in the afore-described/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

Referring to FIG. 16, a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in the present disclosure. On the contrary, when DRX is not configured, PDCCH monitoring/reception may be performed continuously in the time domain. For example, when DRX is not configured, PDCCH reception occasions (e.g., slots with PDCCH SSs) may be configured continuously in the present disclosure. Irrespective of whether DRX is configured, PDCCH monitoring may be restricted during a time period configured as a measurement gap.

Table 6 describes a DRX operation of a UE (in the RRC_CONNECTED state). Referring to Table 6, DRX configuration information is received by higher-layer signaling (e.g., RRC signaling), and DRX ON/OFF is controlled by a DRX command from the MAC layer. Once DRX is configured, the UE may perform PDCCH monitoring discontinuously in performing the afore-described/proposed procedures and/or methods, as illustrated in FIG. 5.

TABLE 6

| | Type of signals | UE procedure |
|---|---|---|
| 1$^{st}$ step | RRC signalling(MAC-CellGroupConfig) | Receive DRX configuration information |
| 2$^{nd}$ Step | MAC CE((Long) DRX command MAC CE) | Receive DRX command |
| 3$^{rd}$ Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the duration of the starting period of the DRX cycle.

Value of drx-InactivityTimer: defines the duration of a time period during which the UE is awake after a PDCCH occasion in which a PDCCH indicating initial UL or DL data has been detected Value of drx-HARQ-RTT-TimerDL: defines the duration of a maximum time period until a DL retransmission is received after reception of a DL initial transmission.

Value of drx-HARQ-RTT-TimerDL: defines the duration of a maximum time period until a grant for a UL retransmission is received after reception of a grant for a UL initial transmission.

drx-LongCycleStartOffset: defines the duration and starting time of a DRX cycle.

drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable to UEs, BSs, or other apparatuses in a wireless mobile communication system.

The invention claimed is:

1. A method for receiving a signal by a terminal in a wireless communication system, the method comprising:
receiving, through higher layer signaling, multicast configuration information including a group-radio network temporary identifier (G-RNTI) related to a multicast service and a hybrid automatic repeat request (HARQ)-feedback enablement configuration related to a downlink control information (DCI)-based HARQ-feedback enablement for the multicast service, and bandwidth configuration information for the multicast service;
receiving, through a physical downlink control channel (PDCCH), DCI having a cyclic redundancy check (CRC) scrambled with the G-RNTI;
receiving a physical downlink shared channel (PDSCH) for the multicast service based on the DCI; and
based on (i) the DCI-based HARQ-feedback enablement being configured through the higher layer signaling, and (ii) a HARQ-feedback being indicated as enabled by HARQ enabling/disabling information in the DCI, transmitting HARQ-feedback information for the PDSCH through a physical uplink control channel (PUCCH) resource indicated by the DCI,
wherein the bandwidth configuration information for the multicast service includes a single integer indicating both of a frequency domain location and a bandwidth for the multicast service, the single integer being one of 0 to 37949.

2. The method of claim 1,
wherein a service identifier (ID) is configured for the multicast service,
wherein the multicast configuration information provides the G-RNTI and the HARQ-feedback configuration, for the service ID.

3. The method of claim 1,
wherein the multicast service is a 3rd generation partnership project (3GPP)-based multicast and broadcast service,
wherein the multicast configuration information provides uplink resource configuration information for the HARQ-feedback.

4. The method of claim 3, wherein the uplink resource configuration information included in the multicast configuration information is related to PUCCH resource configuration information or uplink bandwidth part (BWP) configuration information.

5. The method of claim 1, wherein the terminal receives the DCI by monitoring a physical downlink control channel (PDCCH) in a search space associated with a service ID of the multicast service to be received by the terminal.

6. The method of claim 5, wherein the terminal selects the associated search space from among one or more search spaces configured for the terminal, based on the service ID.

7. The method of claim 1, wherein the PDSCH includes multicast traffic channel (MTCH) data of the multicast service.

8. A non-transitory computer-readable recording medium having recorded thereon a program for carrying out the method of claim 1.

9. The method of claim 1, wherein the frequency domain location and the bandwidth for the multicast service are related to one downlink (DL) bandwidth part (BWP).

10. The method of claim 9, wherein the one DL BWP is an initial DL BWP.

11. A terminal for receiving a signal in a wireless communication system, the terminal comprising:
a transceiver; and
a processor configured to control the transceiver to:
receive, through higher layer signaling, multicast configuration information including a group-radio network temporary identifier (G-RNTI) related to a multicast service and a hybrid automatic repeat request (HARQ)-feedback enablement configuration related to a downlink control information (DCI)-based HARQ-feedback enablement for the multicast service, and bandwidth configuration information for the multicast service;
receive, through a physical downlink control channel (PDCCH), DCI having a cyclic redundancy check (CRC) scrambled with the G-RNTI;
receive a physical downlink shared channel (PDSCH) for the multicast service based on the DCI; and
based on (i) the DCI-based HARQ-feedback enablement being configured through the higher layer signaling, and (ii) a HARQ-feedback being indicated as enabled by HARQ enabling/disabling information in the DCI, transmit HARQ-feedback information for the PDSCH through a physical uplink control channel (PUCCH) resource indicated by the DCI,
wherein the bandwidth configuration information for the multicast service includes a single integer indicating both a frequency domain location and a bandwidth for the multicast service, the single integer being one of 0 to 37949.

12. A method for transmitting a signal by a base station in a wireless communication system, the method comprising:
transmitting, through higher layer signaling, multicast configuration information including a group-radio network temporary identifier (G-RNTI) related to a multicast service and a hybrid automatic repeat request (HARQ)-feedback enablement configuration related to a downlink control information (DCI)-based HARQ-feedback enablement for the multicast service, and bandwidth configuration information for the multicast service;
transmitting, through a physical downlink control channel (PDCCH), DCI having a cyclic redundancy check (CRC) scrambled with the G-RNTI;
transmitting a physical downlink shared channel (PDSCH) for the multicast service based on the DCI; and
based on (i) the DCI-based HARQ-feedback enablement being configured through the higher layer signaling, and (ii) a HARQ-feedback being indicated as enabled by HARQ enabling/disabling information in the DCI, receiving, from a terminal, HARQ-feedback information for the PDSCH through a physical uplink control channel (PUCCH) resource indicated by the DCI,
wherein the bandwidth configuration information for the multicast service includes a single integer indicating both of a frequency domain location and a bandwidth for the multicast service, the single integer being one of 0 to 37949.

13. A base station in a wireless communication system, the base station comprising:
   a transceiver; and
   a processor configured to control the transceiver to:
   transmit, through higher layer signaling, multicast configuration information including a group-radio network temporary identifier (G-RNTI) related to a multicast service and a hybrid automatic repeat request (HARQ)-feedback enablement configuration related to a downlink control information (DCI)-based HARQ-feedback enablement for the multicast service, and bandwidth configuration information for the multicast service;
   transmit, through a physical downlink control channel (PDCCH), DCI having a cyclic redundancy check (CRC) scrambled with the G-RNTI;
   transmit a physical downlink shared channel (PDSCH) for the multicast service based on the DCI; and
   based on (i) the DCI-based HARQ-feedback enablement being configured through the higher layer signaling, and (ii) a HARQ-feedback being indicated as enabled by HARQ enabling/disabling information in the DCI, receive, from a terminal, HARQ-feedback information for the PDSCH through a physical uplink control channel (PUCCH) resource indicated by the DCI,
   wherein the bandwidth configuration information for the multicast service includes a single integer indicating both of a frequency domain location and a bandwidth for the multicast service, the single integer being one of 0 to 37949.

* * * * *